Aug. 4, 1936.　　　　　G. TAUSCHEK　　　　2,049,675

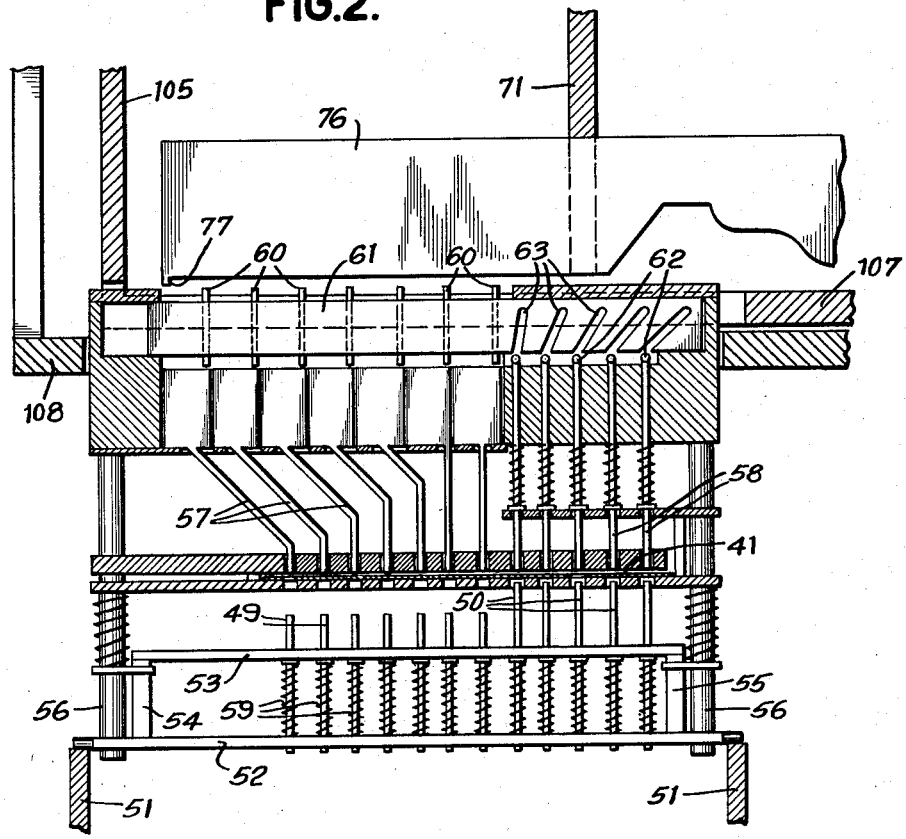
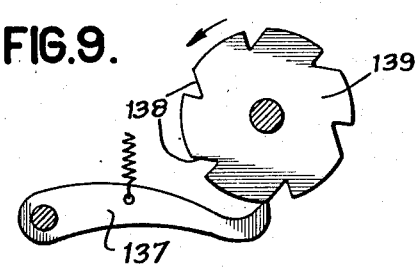

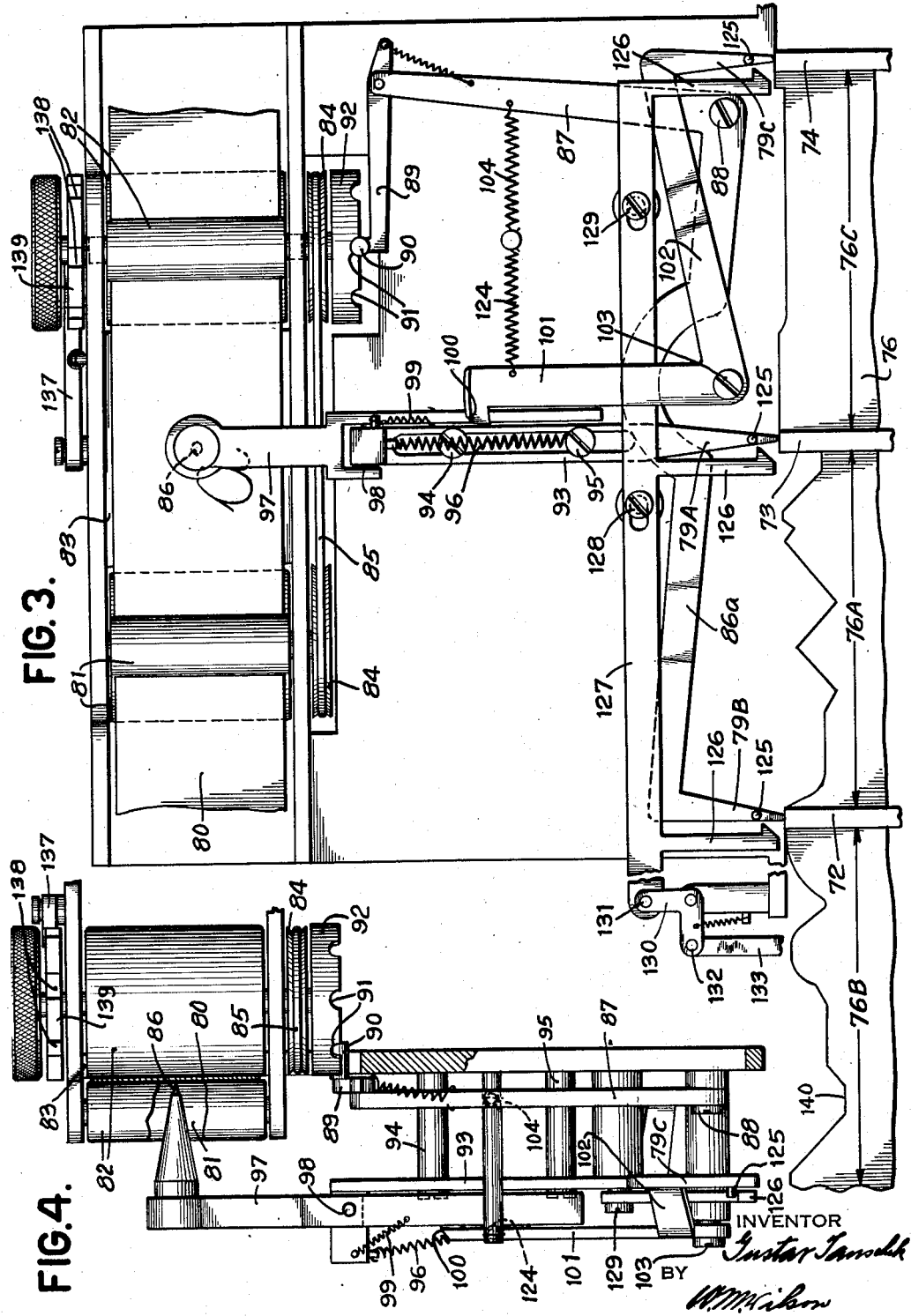

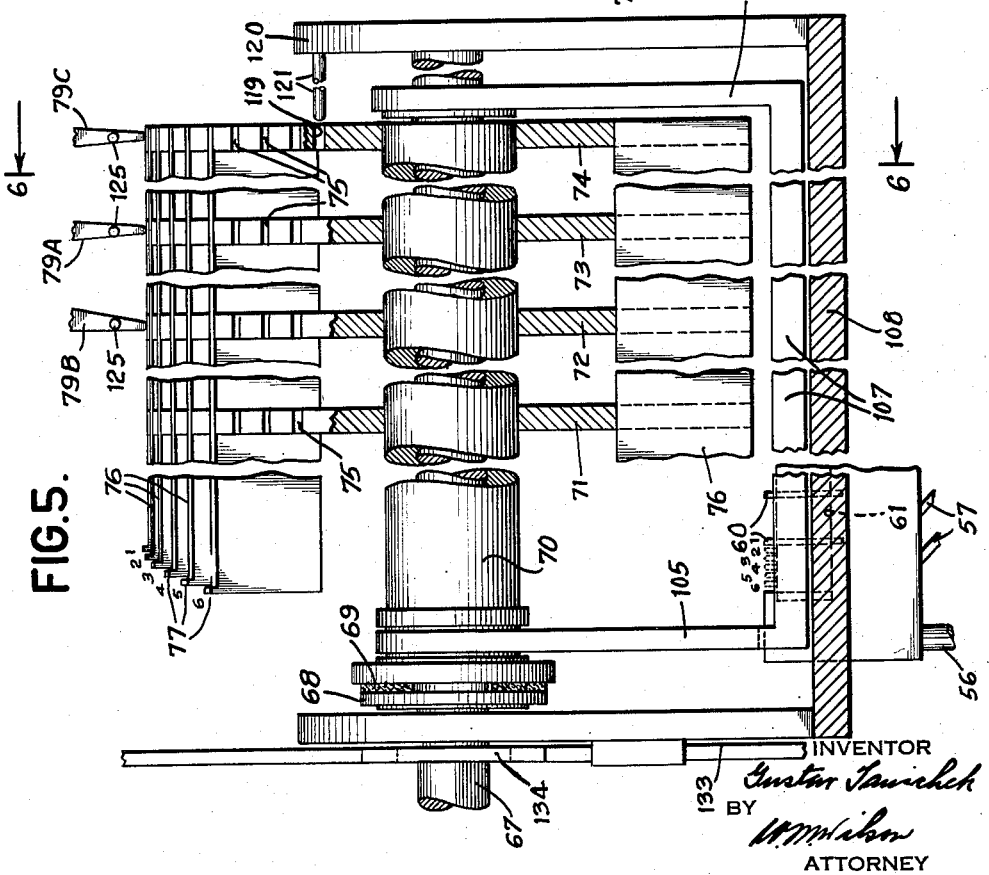

MACHINE FOR SIMULATING HANDWRITING

Filed Dec. 7, 1935　　　5 Sheets-Sheet 5

INVENTOR
Gustav Tauschek
BY
ATTORNEY

Patented Aug. 4, 1936

2,049,675

UNITED STATES PATENT OFFICE 2,049,675

MACHINE FOR SIMULATING HAND-WRITING

Gustav Tauschek, New York, N. Y., assignor to International Business Machines Corporation, New York, N. Y., a corporation of New York Application December 7, 1935, Serial No. 53,297

16 Claims. (Cl. 33—18)

This invention relates to machines which are capable of simulating hand-writing and more particularly relates to that type of machine which is controlled by a perforated card.

The main object of the present invention is to devise a construction whereby the writing may be effected under control of a perforated card.

With the present invention a card may be perforated in a plurality of columns to represent the data which is to be reproduced in the form of intelligible characters. The machine is capable of interpreting the meaning of the holes to control the movement of a stylus or pencil. Each column is adapted to select a particular operating cam, and each cam is provided with pre-designed cam portions which guide the movement of the stylus to simulate writing by hand.

The machine may be used for a number of purposes. It is evident that a card may be perforated by well-known perforating machines and utilized to control the visual exhibition of characters at another place, thus conveying information and presenting it in a more intelligible form.

The machine may also be utilized as an advertising device since such a machine would attract a great deal of attention and wonderment would be exhibited by many who were not aware of its construction. Its attractiveness lies a great deal in the fact that the machine effects movements of a pencil which simulates the movement given by the human hand in writing characters.

Other and relatively important objects will be realized as the description is understood by recourse to the specification and drawings in which latter:

Fig. 2 is a sectional view taken through the card analyzing devices showing the analyzing means and their control over the cam plate stop pins.

Fig. 3 is a view in side elevation of the mechanism provided to effect under control of the operating cams different movements of the pencil or the paper tape on which the characters are reproduced.

Fig. 4 is a view in end elevation of the right end of the mechanism shown in Fig. 3.

Fig. 5 is a view in side elevation illustrating the friction drive for the cam plate carrying unit and also showing in fragmentary portions the construction of the cam plate carrying unit. This view also shows the correlation of the stop pins and the cam plates.

Fig. 6 is a sectional view taken on the line 6—6 of Fig. 5.

Fig. 9 is a detail view of the mechanism provided to secure a space between letters and to effect a desired spacing of the paper strip.

Figure 1:
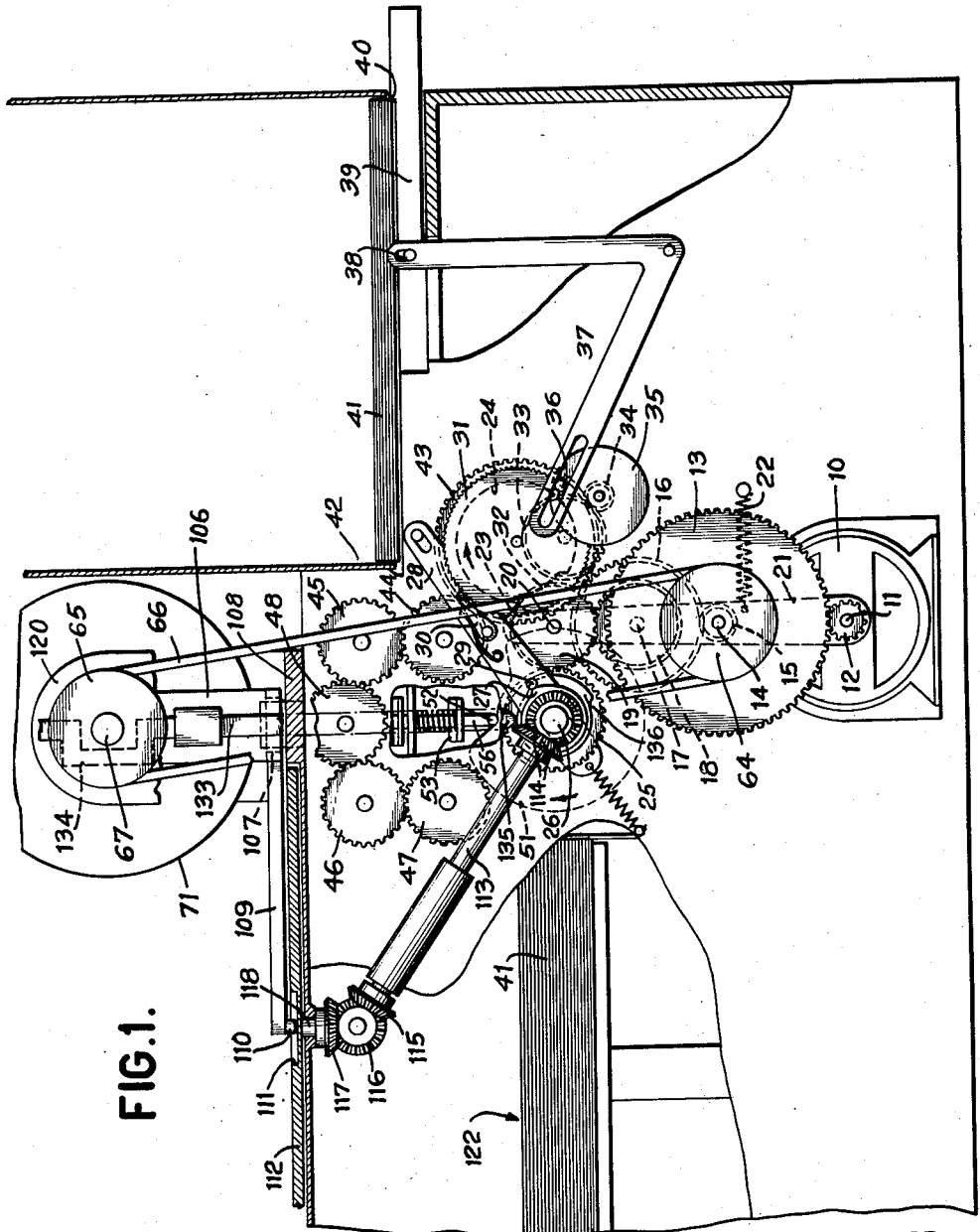
Fig. 1 is an end view of the machine showing particularly the main driving mechanism and the feeding devices for the perforated card.

The power for operating the various mechanisms of the machine is derived from a motor 10 (Fig. 1) adapted to continually rotate a power shaft 11 to which is attached a pinion 12. The pinion 12 is in continuous mesh with a gear 13 loosely mounted upon a stud shaft 14 to which is attached a pinion 15 driving a gear 16 and the latter is loosely mounted upon a stud shaft 17. To the gear 16 there is attached a gear 18 driving a gear 19 pivotally mounted upon a stud shaft 20. The stud shafts 14, 17 and 20 are carried by a frame 21 loosely pivoted on the motor shaft 11 and urged by a spring 22 so that its wedge shaped portion 23 is in engagement with the larger periphery of a cam 24. In the normal position of the parts the cam 24 is adapted to hold the frame member 21 in such a position that the gear 19 is in mesh with a gear 25 secured to a shaft 26. Since the motor is assumed to be rotating constantly, the gear 25 driven by the train of gears just described will continually rotate the shaft 26 and a cam 27 secured thereto. The cam 27 is adapted to reciprocate a slidably mounted plate 28 since said plate carries a roller 29 in engagement with the profile cam 27. For each rotation of the cam 27, the plate 28 will be rocked and by means of a feeding pawl 30 carried thereby and which is in engagement with the teeth of a ratchet wheel 31 attached to the cam 24, the ratchet wheel will be moved step-by-step in a clockwise direction.

When the cam 24 is moved clockwise a slight amount the wedge shaped projection 23 will now engage a recess 32 of the cam 24 permitting spring 22 to draw the frame member 21 clockwise thus permitting gear 19 to engage with a gear 33. The gear 33 is in mesh with a pinion 34 to which is attached a disk 35 having a crank pin 36 fitting in a slot of one arm of a bell crank 37. The vertical arm of the bell crank 37 has a pin and slot connection 38 to a slidably mounted plate 39 provided with a card picker or shoulder 40. The cards which are adapted to control writing of characters are designated by numeral 41 and a series of such cards are placed in a receiving hopper 42.

Since the disk 35 is now given a complete revolution in a counterclockwise direction, the pin 36 will rock the bell crank and by means of the shoulder 40 of the feeding plate 39, the bottom card of the stack will be fed out of the hopper 42.

The pinion 34 is sufficiently wide to mesh with a gear 43 which is adapted to drive a gear 44 which is in mesh with a gear 45. To the gears 44 and 45, there is secured a pair of feeding rollers of the usual form and these rollers are adapted to feed the card fed from the hopper 42 to the left, as viewed in Fig. 1.

A supplemental set of feeding rollers attached to gears 46 and 47 is adapted to further feed the card to the left as viewed in Fig. 1 since the gear 46 is driven by the gear 45 through an idler gear 48.

By the feeding mechanism operated by disk 35, the card is given a movement of translation to the left and is further fed by the feeding rollers until the first card column of the card is in operative relationship with devices to be presently described. When the card column of the card is in the desired position, the wedge shaped portion 23 of the frame member 21 will now be engaged by the higher portion of the cam 24 thereby shifting the gear 19 to the left to be disengaged from the gear 33 and again engaged with the gear 25 to effect operations now to be described.

Figure 7:
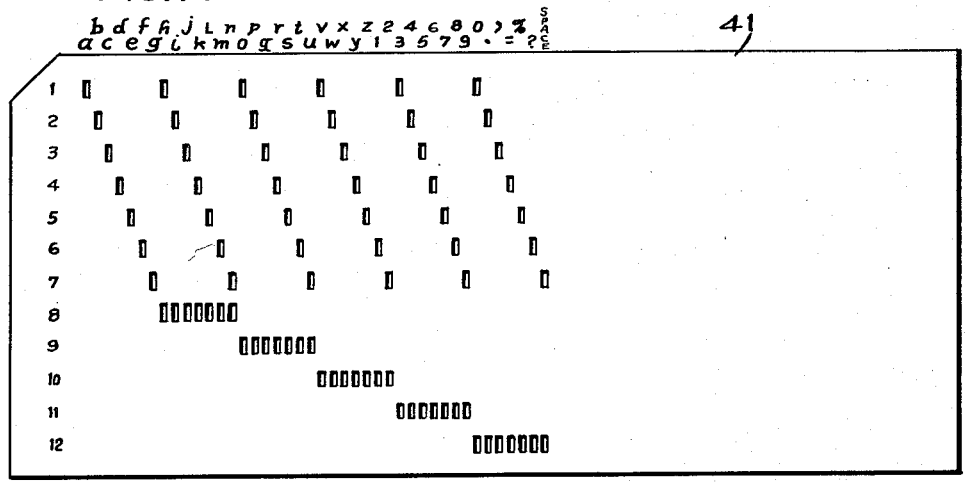
Fig. 7 is a representation of a perforated card adapted to control the machine and shown partially perforated to illustrate the code or hole combinations used to represent the forty-two different characters.

The primary function of the machine when the card 41 is in its first columnar position is to analyze the card to determine which positions in the column are perforated. The form of card adapted to control the present machine shown in Fig. 7 is well known in the tabulating machine art and is fully shown and described in the patent to C. D. Lake, No. 1,772,492 dated August 12, 1930. Each column is adapted to have twelve index point positions which are adapted to be perforated according to the code shown in Fig. 7 to represent forty-one different characters. As shown in Fig. 7, letters a to g are designated by single perforations located in positions 1 to 7, respectively. Letters of the next group, or h to n, are designated by perforations in positions 1 to 7 and in addition thereto a perforation in the eighth index point position. The perforations at the eighth, ninth, tenth, eleventh and twelfth positions used in connection with the perforations at the 1 to 7 position are herein designated as "pilot holes."

From Fig. 7, it is evident therefore that all the letters of the alphabet, all the digits and five special marks may be represented by the code of perforations shown. The present machine is adapted to have mechanically operated devices for reproducing writing under the control of the perforations in each column of the card. When the column of the card to be analyzed is in the proper position the twelve index point positions are in correlation with a series of analyzing pins 49 designating a group of seven pins correlated with index point positions 1 to 7, and a series of analyzing pins 50 correlated with the pilot holes at the eighth to twelfth index point positions.

During the initial operation of the shaft 26 a cam 51 secured to the shaft 26 is adapted during its initial clockwise movement to raise a frame comprising a lower plate 52 (Fig. 2) and an upper plate 53 joined by rods 54 and 55. The frame is guided in its reciprocating movement by means of rods 56 secured to the frame of the machine. Preferably a pair of cams 51 is provided so as to raise both sides of the frame just described. The analyzing pins 49 and 50 are slidably mounted in the frame just described and when the frame is elevated, a pin 49 is adapted to pass through a hole in the card at the corresponding index point position and elevate a related pin operating member 57. The group of analyzing pins 50 is also adapted to coact with the card and a pin 50 will pass through a hole at a corresponding index point position and thereby elevate a related operating pin 58. A coil spring 59 surrounds each of the analyzing pins 49 and 50 so that in the event certain positions are not perforated, the pins 49 and 50 will be held back during the elevation of the frame and springs 59 will be merely tensioned.

Each of the pin operating members 57 is adapted to elevate a related stop pin 60. A series of such pins fit loosely in a series of holes formed in a plate 61. If in the event that the first index point position should be perforated, it will be obvious that the pin 49 at the extreme left will pass through the card and elevate its related pin operating plate 57 to thereby cause the related pin 60 to be raised to a stop position. However, the pin 60 just described is adapted to have five other stop positions in accordance with the lateral movement given to the pin 60 to the left as viewed in Fig. 2. These various positions are adapted to be effected under control of the pins 58 one of which is elevated depending upon which pilot hole is utilized. Each pin 58 carries a pin 62 adapted to enter a corresponding cam slot 63 of the plate 61. The cam slots 63 are of different inclinations so that each pin 58 when elevated can move the plate 61 to the left a desired amount.

Summarizing, therefore, it will be evident that each stop pin 60 may have six different stop positions and since there is a series of seven stop pins 60, by the various combinations of perforations heretofore described, forty-two stop positions may be derived for a purpose to be explained hereinafter.

After the cycle of machine operation corresponding to operations performed under one card column, the cams 51 permit the frame carrying the analyzing pins 49 and 50 to be lowered to thus permit the card to be stepped a space of one column in order that the next card column may be analyzed.

Referring to Fig. 1 and recalling that the pinion 15 is continually rotating, it will be obvious that a pulley 64 secured to the pinion will also rotate continually. The pulley 64 is adapted to drive a pulley 65 by means of a belt connection 66 and the pulley 65 is rigidly secured to a shaft 67. Shaft 67 is also disclosed in Fig. 5 wherein it will be seen that secured to shaft 67 is one element 68 of a friction drive. The other element 69 of the friction drive is secured to a sleeve 70 overlying the shaft 67. Secured to the sleeve 70 is a series of supporting plates 71, 72, 73, 74. Each plate 71 to 74 is provided with a series of radially cut slots 75 (Fig. 6) in which fit a series of cam plates 76, forty-two in number. Each plate 76 extends to the left as shown in Fig. 5 a different distance so that stop lugs integral with each of plates 76 are so positioned to present forty-two stop lugs which are in forty-two different planes.

The group of plates 76 corresponding to characters *a* to *g* have lugs 77 of other plates 76 so positioned as to coact with the pin 60 at the extreme left (Fig. 2) when it is positioned in any of its six different positions. Therefore, the pin 60 when elevated will coact with the lug 77 of one of the cam plates 76, dependent upon the lateral position of the pin 60.

Since sleeve 70 is constantly revolving, it will be seen that when one of the pins 60 is elevated, it will coact with the corresponding stop lug 77 thereby stopping the movement of the sleeve 70 and the parts carried thereby since the friction drive 68, 69 will permit this movement.

Each cam plate 76 is provided with three distinct cam portions 78A, 78B and 78C on its outer edge. Each of these distinct cam portions is adapted to cooperate with fingers 79A, 79B and 79C whereby in the lateral movement of a cam plate each of the fingers will be elevated or depressed dependent upon the configuration of the cam. As will be subsequently explained, all of the cam plates 76 will be given a movement to the left as viewed in Fig. 5 but of course only the selected cam plate 76 will control the position of the fingers 79A, 79B and 79C.

The purpose of the fingers 79A, 79B and 79C shown in Figs. 3 and 5 will now be described. Referring to Fig. 5, it will be noted that while the cam plate carrying unit is rotating these fingers 79A, 79B, 79C will be in engagement with the outer circular periphery of the supporting plates 72, 73 and 74 and since the outer edge of each of the cam plates is cut at each of these positions to correspond with the periphery of the plates 72 to 74 inclusive, it will be clear that fingers 79A, 79B and 79C coact with a substantially circular track during the rotation of the cam plate carrying unit.

Referring now to Figs. 3 and 4, it will be observed that a paper tape 80 passes between two sets of rollers 81 and 82 and that the tape passes over a flat bed platen 83. In order to cause a movement of the paper strip over the platen 83 either to the right or left, the supporting shaft of the lower roller of each of the sets of rollers 81, 82 has secured thereto a pulley 84.

The two pulleys are connected by a belt connection 85. In order to move the paper tape to the right and left of a stylus or pencil 86 the following mechanism is preferably employed and is under control of the fingers 79B. The finger 79B comprises a downward projection of one arm 86a of a bell crank, the arm 87 constituting the vertical arm of said bell crank. The bell crank 86a, 87 is pivoted by a screw 88. The vertical arm 87 of the bell crank carries a spring pressed arm 89 having a pin 90 in engagement with a notch 91 of an annular ring 92 secured to the shaft of the lower roller of the set 82. It is therefore evident that with the pencil 86 stationary a downward movement of the finger 79B will cause the paper tape 80 to be moved to the left with respect to the pencil 86. When the finger 79B is elevated, the paper tape 80 will be moved to the right with respect to the pencil 86.

In order to secure the vertical movement of the pencil 86 the following mechanism is preferably employed. The finger 79A is an integral part of a plate 93 slidably mounted by means of screws 94 and 95 and said plate is normally urged downwardly by means of a spring 96 so that finger 79A engages the cam portion 76A of the selected cam plate. The pencil 86 is carried by a plate 97 pivoted at 98 to the upper portion of the plate 93. A spring 99 is adapted to urge the pencil 86 towards the paper tape 80. Such movement is frustrated by means of a wedge shaped projection 100 integral with one arm 101 of a bell crank.

The arm 102 is the other arm of such bell crank and the finger 79C is an integral part of the arm 102. The bell crank comprising arms 101 and 102 is pivoted by the screw 103. In the event that the finger 79C should be in the position shown in Fig. 3 and the finger 79A is elevated or lowered, it will be obvious that the pencil 86 will move upwardly and downwardly over the paper tape 80 while the pencil touches the tape to produce a line.

The bell crank comprising arms 86a and 87 has connected thereto a spring 104 normally urging the finger 79B to contact with the outer cam portion 76B of the selected cam plate 76. Correspondingly, a spring 124 functions to cause the finger 79C to engage the cam portion 76C of the selected cam plate 76. The movement of the finger 79C is under control of the cam section 76C of the selected cam plate 76 and when the finger 79C is lowered, the wedge shaped projection 100 of the arm 101 will be withdrawn from arm 101 to permit the spring 99 to force the pencil 86 to engage with the tape 80.

It is obvious that an up and down movement of the plate 93 will cause the pencil 86 to travel upwardly and downwardly over the tape 80 and the movement of the paper tape 80 to the right or left of the pencil 86 will cause a horizontal line to be made on said tape. A simultaneous movement of the tape and the pencil 86 will cause the latter to outline on the paper tape a form which is dependent upon the cam portions 76A, 76B and 76C. Fig. 3 shows the cam portions for writing the letter "*a*".

The composite movements of the pencil 86 under control of the various cam portions of the cam 76 will cause the pencil to form the outline shown in Fig. 3 on paper tape 80.

Obviously, each cam plate 76 is formed with a different configuration in order to give different movements of the paper tape and pencil independently of each other or simultaneously at various rates so as to be capable of writing the remaining characters which is possible by the present embodiment. It is also pointed out that the finger 79C is elevated when the pencil 86 is to be moved without marking the tape which is necessary when the pencil 86 is to be moved from a terminating position to another starting position.

It was previously stated that the movements of the fingers 79A, 79B and 79C are caused by a lateral movement of the selected cam plate 76. The mechanism whereby the cam plate carrying unit may be laterally displaced will now be described.

The unit is mounted between a yoke comprising arms 105 and 106 (Figs. 5 and 6) joined together by a base plate 107 and the latter is suitably guided so that the yoke may be moved laterally on a base plate 108.

Referring to Fig. 1, the base plate 107 is provided with a laterally extending projection 109 carrying a roller 110 in engagement with a cam slot 111 of a cam plate 112. In order to rotate the cam plate 112 so that the cam slot 111 therein may move the yoke frame 105, 106, 107 laterally, the following mechanism is preferably employed. The shaft 26 is adapted to drive a shaft 113 by means of a pair of bevelled gears 114. The shaft 113 carries at its upper end a bevelled gear 115 in engagement with a bevelled gear 116 which is also in mesh with a bevelled gear 117. The latter is secured to a short shaft 118 which is also connected with the cam plate 112.

It is desirable that upon a lateral movement of the cam plate carrying unit to the right, as viewed in Fig. 5, the unit be held against further rotation irrespective of the disengagement of the pin 60 from the lug 77 of one of the cam plates 76. To this end the plate 74 is provided with a series of holes 119 (Fig. 6) one for each cam plate 76. The frame plate 120 of the machine is provided with a laterally extending pin 121 (Fig. 5) so positioned as to engage with one of the holes 119 as the unit is moved to the right. In this manner, the unit is held against further rotation while the selected cam plate 76 is adapted to function and the arrangement just described is also effective to hold the unit during its return movement. When the pin 121 is free of the hole 119 with which it was engaged the cam plate carrying unit will again be rotated until it is again stopped by the pin 60 next elevated. During this time the pin 60 which was previously elevated will have been lowered to normal position.

It was previously stated that when the cam plate carrying unit was moved to the right the pin 60 (Fig. 5) which was elevated is disengaged from the lug 77 of one of the cam plates 76. Prior to the restoration of the cam plate carrying unit the recesses in the cams 51 (Fig. 1) permit the frame carrying the pins 49 and 50 (Fig. 2) to be lowered. The pins which were elevated are now lowered and the pin 60 which was previously raised will now freely drop to its normal position. Also the pin 58 will be returned to normal by the coil spring surrounding it and the spring will act to positively return the plate 61 to its normal position.

After the card is free of the analyzing pins 49 and 50 the cam 27 (Fig. 1) will shift the plate 28 and the pawl 30 engaging a tooth of the ratchet wheel 31 will cause the feeding rollers to feed the card a space of one column preparatory to operations effected under control of the perforations in a succeeding card column.

After the last card column has been analyzed the ratchet wheel 31 will be turned sufficiently so that the recess 32 of cam 24 (Fig. 1) will now cooperate with the wedge-shaped projection 23. The frame member 21 will now be shifted so as to disengage the gear 19 from the gear 25 and be engaged with the gear 33. Shaft 26 will now stop and the feeding plate 39 will feed the next card 41 into the machine to repeat the operations just described.

After a card has controlled the machine, it is fed by the feeding rollers to a storage hopper 122 (see Fig. 1).

It is desirable to lock the fingers 79A, 79B and 79C during the return movement of the cam plate carrying unit. To this end each of the fingers has secured thereto a pin 125 (Fig. 3) which is normally free of related locking fingers 126. In the normal position of the parts, the fingers 79A, 79B, 79C may, therefore, be freely movable under control of the various cam portions of the selected cam plate 76. The locking fingers 126 are an integral part of a plate 127 slidably mounted by screws 128 and 129. One arm of a pivoted bell crank 130 is connected at 131 to the plate 127 and at 132 to a link 133. The link 133 passes downwardly from the position shown in Fig. 3 and is formed with a bent portion 134 (Fig. 1) adapted to straddle the shaft 67. The lowermost portion of the link 133 has a portion 135 adapted to be operated by a cam 136 secured to the shaft 26. The cam portion of the cam 136 is adapted to elevate the link during the time that the cam plate carrying unit is restored to normal thereby holding the fingers 79A, 79B and 79C. The fingers are, however, normally unlocked so that they may take out positions depending upon the cam formations of the selected cam plate 76.

Figure 8:
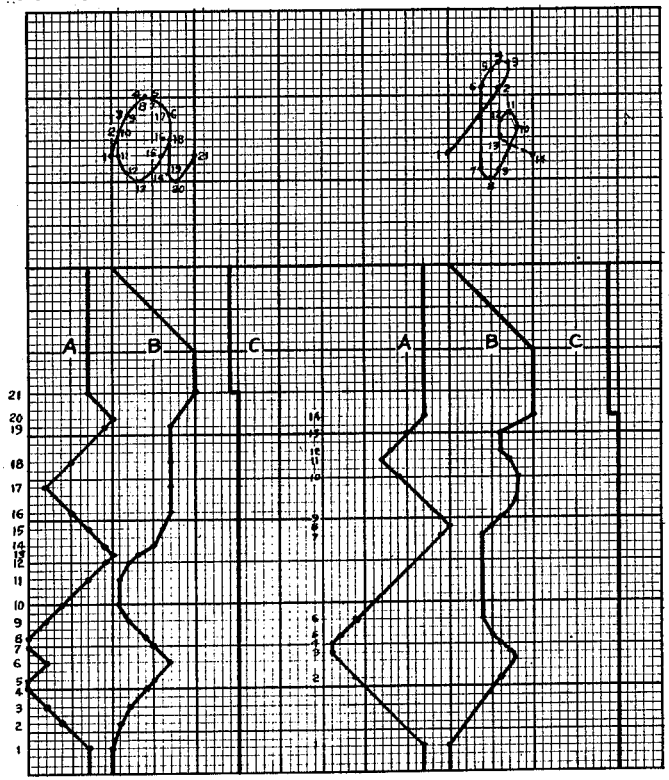
Fig. 8 is a graph showing how the formation of the operating cams is derived to effect the desired movements of the stylus for letters "a" and "b".

Fig. 8 is an illustration of a graph utilized to predesign the cam formations for two of the cam plates 76 which are adapted to cause the outlining of the letters "a" and "b". The design of the cams 76 for causing the outline of the remaining letters or characters is followed similarly. In each instance, it will be noted that the desired movement of the pencil 86 is dependent upon the cam formation, a straight up and down movement being controlled by the cam portion 76A, a horizontal movement being controlled by the cam portion 76B, and by a combination of these two movements the desired component can be derived. The function of the cam portion 76C has heretofore been explained.

In order to prevent the outlining of the letters over each other each cam plate is provided in its cam portion 76B thereof with a deep recess 140 (Fig. 3). This recess is of sufficient depth so that the bell crank 86a—87 will be rocked to an extent greater than that permitted by recesses in the other part of the cam portion 76B controlling the representation of a character. In this instance a pawl 137 (Figs. 3 and 9) will engage the successive tooth 138 of a ratchet wheel 139 rotatable with the lower roller of the set 82. The paper tape 80 will now be held against retraction and the arm 89 will move to the right independent of any return rotation of the annular ring 92.

To form a space between words a "space" cam plate is provided and is selected under control of perforations at the 7th and 12th positions, (see Fig. 7). Its cam portions 76C and 76A are substantially horizontal while its cam portion 76B has only a recess 140 to effect the function just described. The "space" cam plate will, however, not permit the stencil 86 to contact with the paper strip or make any mark thereon.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, in combination, means for analyzing a card to determine which character is represented by perforations therein, a plurality of cam devices for causing a relative movement between an inscriber and a record material for forming the outline of a character on said record material, and means controlled by said analyzing devices for selecting said cam devices in accordance with the character represented on said card.

2. In a machine of the class described, in combination, means for successively analyzing columns of a card to determine the characters represented by the columns of perforations, a plurality of cam devices for causing a relative movement between an inscriber and a record material for forming the outline of different characters on said record material, means controlled by said analyzing means for selecting a cam device appropriate to the character represented in each column, and means for feeding the record strip to provide a space between characters representing successive words.

3. In a machine of the class described, in combination, means for feeding one of a series of perforated cards to perforation analyzing means, means automatically operable under control of said analyzing means for outlining on a record tape characters represented by a plurality of columns of perforations in said card, and means for feeding a successive card to said analyzing means automatically when the operation of the first-named means has been completed under control of a preceding card.

4. In a machine of the class described, in combination, means for analyzing a card to determine the characters represented by perforations in successive columns, a plurality of cam operating devices, means for causing a portion of one of said cam devices for moving a record tape relative to a record tape inscriber and for causing the other cam portions of the same cam device to cause a movement of the inscriber relative to the record tape, and means controlled by said analyzing means to select the cam devices in accordance with the perforations in the card columns.

5. In a machine of the class described, in combination a rotatable member carrying a plurality of cam devices, means for causing a predetermined movement of said member to select a desired cam device for operation, means controlled by a lateral movement of a selected cam device for causing relative movements of an inscriber and a tape to cause the delineation of a character on said tape in accordance with cam formations on said selected cam device, and means for causing a lateral movement of the selected cam device.

6. In a machine of the class described, the combination with an inscriber, of a plurality of cam devices each adapted to cause said inscriber to effect a relative movement between the latter and a record tape to outline on the latter representations of different characters, and cam device selecting means comprising differentially positioned stop lugs movable with said cam devices, and a plurality of stop pins, each adapted to be elevated and positioned so as to engage with a particular stop lug.

7. In a machine of the class described, the combination with an inscriber, of a plurality of cam devices rotatable as a unit, and each adapted to be moved laterally to cause relative movements of said inscriber and a record tape, means for causing a rotation of said cam devices, means for predetermining the rotary movement given to said cam devices for selecting a particular cam device, and means for moving the selected cam device laterally.

8. In a machine of the class described, in combination, an inscriber for outlining different characters on a record material, means for analyzing a perforated record, a plurality of cam means, each having one cam section for guiding a movement of said inscriber on said record material, another section to control the engagement of the record material and inscriber, and another section for causing said material to be shifted during the movement of said inscriber, all of said sections cooperating to scribe the outline of a character on said record material, and means controlled by said analyzing means for selecting one of said plurality of cam means for determining the characters to be outlined.

9. In a machine of the class described, the combination with means for analyzing column by column perforations in each of a plurality of columns of a card which is perforated in a plurality of columns to represent a series of characters by one or more perforations in each column, means controlled by said analyzing means and automatically operable for scribing the outline of the characters on a record tape, means for causing the outline of characters to follow successively, and means for causing an automatic operation of the last-named means for each card column analyzed by said analyzing means.

10. In a machine of the class described, in combination, means for analyzing a series of perforated cards, perforation analyzing means for said cards, an operating mechanism, means for causing said mechanism to feed a card from a supply stack to said analyzing mechanism, a plurality of means each operated by said operating mechanism and selected under control of said analyzing means for scribing the outline of different characters on a record tape, means for spacing characters between successive words, means for ejecting the card to a storage stack, and means for thereafter automatically continuing the operation of said operating mechanism after operations under control of one card is completed and automatically feeding a successive card by said feeding means.

11. In a machine of the class described, the combination with a plurality of cam means, each operable to cause a relative movement between an inscriber and a record tape to graphically outline on the latter different characters, and means for selecting said cam means in accordance with a perforated control sheet.

12. In a machine of the class described, an inscriber for marking a sheet, a single cam element having at its outer edge a continuous cam periphery forming sectionalized cam portions, means for causing one of said cam portions to effect a movement of said inscriber in one direction, means for causing another cam portion to effect a simultaneous or dis-simultaneous movement of a record tape with respect to said inscriber and means for causing the remaining cam portion to effect a movement of said inscriber to selectively contact with a record tape.

13. In a machine of the class described, in combination, a perforated record containing perforations arranged in sections, analyzing means for analyzing said perforations, a plurality of means each distinct in configuration for scribing the outline of different characters on a record material, means controlled by said analyzing means for selecting for operation the means appropriate to the character represented by the perforations of the section analyzed, and means for thereafter effecting an operative relationship between a successive section of the perforated record and said analyzing means to cause the selection of the means appropriate to the character represented by the perforations in the successive section.

14. In a machine of the class described, in combination, a plurality of means each operable alone for causing a relative movement between an inscriber and a record material to graphically outline on the latter different letters, and means for selecting said means in accordance with perforations on a control sheet, said perforations occurring according to a preselected code.

15. In a machine of the class described, in combination, a perforated sheet containing perforations arranged in columns, said perforations occurring according to a code for the representation of different characters, means for successively analyzing the columns of perforations, and means controlled by said analyzing means for scribing the outline on a record tape of a character represented by the perforations.

16. In a machine of the class described, in combination, a movable cam plate having in a continuous cam formation in the direction of its length three distinct cam portions, means controlled by one section for causing an engagement between an inscriber and a record material, means controlled by another section for causing a movement of the inscriber relative to said record material, means whereby the remaining section causes a movement of said record material relative to said inscriber, and means for guiding said cam plate for movement.

GUSTAV TAUSCHEK.